United States Patent
Irle et al.

(10) Patent No.: US 7,576,643 B2
(45) Date of Patent: Aug. 18, 2009

(54) SENSOR FOR MEASURING PHYSICAL VARIABLES AND FOR PASSING ON THE MEASURED VARIABLE, CIRCUIT HAVING SUCH A SENSOR AND METHOD FOR OPERATING THE SENSOR AND THE CIRCUIT

(75) Inventors: Henning Irle, Lippstadt (DE); Manfred Bartscht, Salzkotten (DE); Johannes Meiwes, Markgroeningen (DE); Reiner Schweinfurth, Eppingen (DE)

(73) Assignees: Hella KGaA Hueck & Co., Lippstadt (DE); Robert Bosch GmbH, Stuttgart (DE)

( * ) Notice: Subject to any disclaimer, the term of this patent is extended or adjusted under 35 U.S.C. 154(b) by 198 days.

(21) Appl. No.: 11/520,381

(22) Filed: Sep. 13, 2006

(65) Prior Publication Data

US 2007/0076336 A1 Apr. 5, 2007

Related U.S. Application Data

(63) Continuation of application No. PCT/EP2005/002354, filed on Mar. 5, 2005.

(30) Foreign Application Priority Data

Mar. 13, 2004 (DE) ................. 10 2004 012 267

(51) Int. Cl.
*H04M 11/04* (2006.01)
(52) U.S. Cl. .............. 340/538; 340/506; 340/511; 324/537

(58) Field of Classification Search ............... 340/506, 340/511, 538, 517, 521; 324/537, 236, 538, 324/555
See application file for complete search history.

(56) References Cited

U.S. PATENT DOCUMENTS

| | | | | |
|---|---|---|---|---|
| 5,142,235 A | * | 8/1992 | Matsumoto et al. | 324/537 |
| 5,283,418 A | * | 2/1994 | Bellows et al. | 219/130.01 |
| 5,339,782 A | | 8/1994 | Gölzer et al. | |
| 5,373,823 A | | 12/1994 | Kuroda et al. | |
| 5,394,409 A | | 2/1995 | Barthel et al. | |

(Continued)

FOREIGN PATENT DOCUMENTS

DE 41 33 268 A1 4/1993

(Continued)

*Primary Examiner*—Daryl Pope
(74) *Attorney, Agent, or Firm*—Laurence A. Greenberg; Werner H. Stemer; Ralph E. Locher

(57) ABSTRACT

A sensor for measuring a variable, in particular a physical variable, includes at least one converter element converting the variable into an electrical signal. At least one electronic signal processing unit conditions and/or processes the electrical signal to provide a sensor signal. The at least one electronic signal processing unit has at least one diagnosis device. An interface passes on the sensor signal through a connection, in particular a cable connection, to an electrical device, in particular a control device. The diagnosis device causes a fault signal instead of the sensor signal to be present at the interface when a fault occurs, for clearly distinguishing a fault at the interface from a processing fault. A circuit having such a sensor and a method for operating the sensor and the circuit are also provided.

20 Claims, 2 Drawing Sheets

U.S. PATENT DOCUMENTS 5,400,246 A * 3/1995 Wilson et al. ................. 700/17
5,757,641 A    5/1998 Minto
6,345,225 B1   2/2002 Böhm et al.
6,646,397 B1  11/2003 Discenzo

FOREIGN PATENT DOCUMENTS

| DE | 198 32 167 A1 | 5/1999 |
| EP | 0 307 191 A2 | 3/1989 |
| EP | 0 524 330 A1 | 1/1993 |

* cited by examiner

SENSOR FOR MEASURING PHYSICAL VARIABLES AND FOR PASSING ON THE MEASURED VARIABLE, CIRCUIT HAVING SUCH A SENSOR AND METHOD FOR OPERATING THE SENSOR AND THE CIRCUIT

CROSS-REFERENCE TO RELATED APPLICATIONS

This is a continuing application, under 35 U.S.C. §120, of copending International Application No. PCT/EP2005/002354, filed Mar. 5, 2005, which designated the United States; this application also claims the priority, under 35 U.S.C. §119, of German Patent Application DE 10 2004 012 267.9, filed Mar. 13, 2004; the prior applications are herewith incorporated by reference in their entirety.

BACKGROUND OF THE INVENTION

1. Field of the Invention

The present invention relates to a sensor for measuring in particular physical variables and for passing on the measured variable through an interface (in particular an output) as a sensor signal to an electrical device, in particular a control device. The invention also relates to a circuit having at least two sensors, including a sensor of the type mentioned at the outset, a method for operating a sensor of the type mentioned at the outset and a method for operating the circuit including at least two sensors.

A sensor of the type mentioned at the outset has a converter element which converts the variable into an electrical signal. In addition, the sensor includes an electronic evaluation circuit, for example in the form of a signal processing unit, for the purpose of conditioning and/or processing the electrical signal to provide the sensor signal. In that case, the electronic circuit has a device for diagnosis (diagnosis device).

In the case of the sensors known from the prior art, the diagnosis device monitors the various functions of the sensor. When a fault occurs, the end stage of the sensor is typically switched off in such a way that there is no longer a sensor signal present at the output of the sensor.

The disadvantage of such a sensor in which the sensor is switched off in the event of a fault is the fact that the electrical device to which the sensor is connected cannot distinguish whether failure of the sensor has been brought about by a fault in the sensor or by a fault in the line connection between the sensor and the electrical device. This means that it is necessary for an operator to first have to analyze which type of fault is present before corrective maintenance can be carried out. This is often time-consuming and, because trial-and-error methods are often used to find the fault, leads to unnecessary assembly operations.

SUMMARY OF THE INVENTION

It is accordingly an object of the invention to provide a sensor for measuring physical variables and for passing on the measured variable, a circuit having such a sensor and a method for operating the sensor and the circuit, which overcome the hereinafore-mentioned disadvantages of the heretofore-known devices and methods of this general type and in which the sensor clearly signals the occurrence of a fault within the sensor at its output.

With the foregoing and other objects in view there is provided, in accordance with the invention, a sensor for measuring a variable, in particular a physical variable, which comprises at least one converter element converting the variable into an electrical signal. At least one electronic signal processing unit conditions and/or processes the electrical signal to provide a sensor signal. The at least one electronic signal processing unit has at least one diagnosis device. An interface passes on the sensor signal through a connection, in particular a cable connection, to an electrical device, in particular a control device. The diagnosis device causes a fault signal instead of the sensor signal to be present at the interface when a fault occurs, for clearly distinguishing a fault at the interface from a processing fault.

Therefore, according to the invention, the diagnosis device is constructed in such a way that, when a fault occurs, a clear fault signal is present at the interface instead of the sensor signal. This fault signal may preferably be a predetermined sequence of different electrical potentials. The fault signal may be a repetitive pattern of electrical potentials. The fault signal can also contain information on the nature of the fault, which is particularly advantageous for targeted corrective maintenance. In a simple case, the fault signal may, for example, be a continuous change in the minimum or maximum electrical potential which is available in the sensor.

As a result of the fact that the fault signal is present at the output of the sensor in the event of the occurrence of a fault in a sensor, it is possible to clearly determine from the outside that the fault is present within the sensor and that there is no fault in the cable connection between the sensor and the electrical device to which the sensor is connected.

With the objects of the invention in view, there is also provided a circuit comprising at least two sensors which may include a sensor according to the invention. Circuits including at least two sensors are used in particular in the redundant measurement of physical variables. In this case, a synchronism monitoring device can preferably be provided in a sensor having a construction according to the invention. The synchronism monitoring device indicates a deviation of the electrical signals and/or the sensor signals of the various sensors at least to the diagnosis device of one of the sensors, preferably of a sensor according to the invention.

With the objects of the invention in view, there is additionally provided a method for operating a sensor, which comprises the following steps: during fault-free operation, the converter element converts the variable to be measured into an electrical signal and the electronic circuit conditions the electrical signal and/or processes it to provide the sensor signal which can be tapped off at the interface (output). During faulty operation, the diagnosis device detects the occurrence and/or the nature of the fault and produces a fault signal, which can be tapped off at the interface (output) instead of the sensor signal.

With the objects of the invention in view, there is concomitantly provided a method for operating a circuit including at least two sensors, of which a first sensor is a sensor according to the invention, in such a way that the at least one sensor according to the invention is operated in accordance with a method according to the invention. The first sensor, i.e. the sensor according to the invention, preferably monitors the synchronism of the at least two sensors through the use of the synchronism monitoring device and, in the event of a deviation of the electrical signals and/or the sensor signals, the first sensor indicates the fault signal at the interface.

Other features which are considered as characteristic for the invention are set forth in the appended claims.

Although the invention is illustrated and described herein as embodied in a sensor for measuring physical variables and for passing on the measured variable, a circuit having such a sensor and a method for operating the sensor and the circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
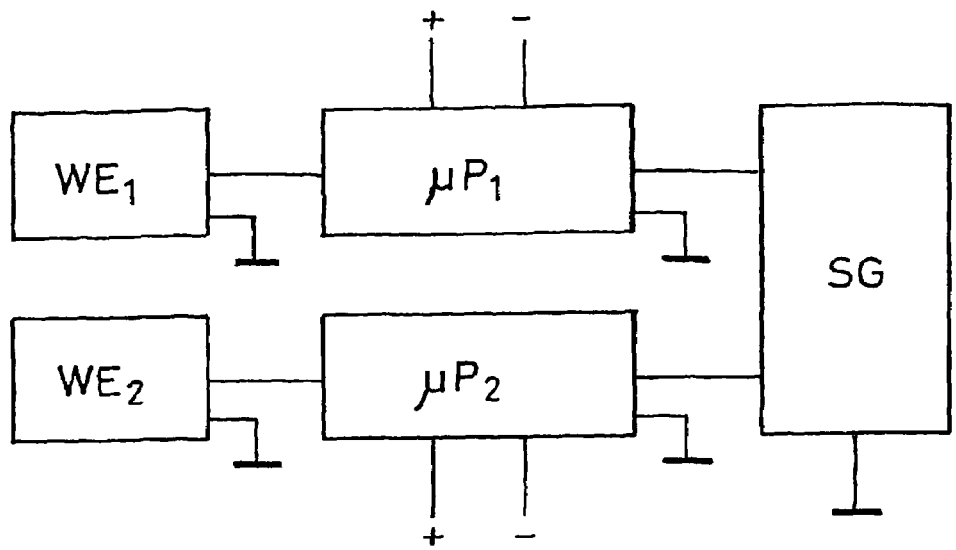
FIG. 1 is a basic block circuit diagram showing a connection of sensors, according to the invention, to a control device.

Referring now to the figures of the drawings in detail and first, particularly, to FIG. 1 thereof, there are seen sensors illustrated in a basic circuit diagram including a converter element $WE_1$, $WE_2$ and a signal processing unit $\mu P_1$, $\mu P_2$, which are connected to a control device SG. The converter elements $WE_1$, $WE_2$ detect the same physical variable, for example a speed or a pressure. The detected physical variable is converted in the converter elements into an analog electrical signal, which is fed to the signal processing units $\mu P_1$, $\mu P_2$. Then, the analog signals are processed, in particular digitized, amplified and conditioned, in the signal processing units in order to be passed on to the electrical control device SG through an output as a sensor signal. The converter elements $WE_1$, $WE_2$ and the signal processing units $\mu P_1$, $\mu P_2$, which form the sensors according to the invention, are of identical construction, with the result that identical sensor signals are made available at the output of the signal processing units $\mu P_1$, $\mu P_2$. Therefore, two redundant sensors are connected to the control device SG. If one of the two sensors fails, the sensor signal of the second sensor is made available to the control device SG. A corresponding, non-redundant system could, for example, have only the control device SG, a signal processing unit $\mu P_1$ and a converter element $WE_1$.

One problem with the previously known systems having two redundant sensors was the fact that the control device to which the sensors were connected could not always clearly identify which of the two sensors had supplied a faulty sensor signal or had failed. A further problem was the fact that it was not possible to clearly identify what the nature of the fault was by using the supplied sensor signal. In that case, the fault could be a fault in the converter element, in the signal processing unit or else a fault in cable connections between the signal processing unit and the control device. That latter problem is also of significance therein in the case of individually used sensors.

This is where the invention comes into play. Namely, the sensors according to the invention ensure that, in the event of a faulty sensor, the presence of a fault in the sensor is indicated as a clear fault signal at the output, i.e. at the interface of the signal processing unit instead of the sensor signal. In this case it is, in principle, of subordinate importance for the invention whether the sensors according to the invention are used in pairs in a redundant system or as "individual sensors" in a system. On one hand, as soon as the control device detects such a fault signal, it is clear to the control device that there is a fault present at the corresponding sensor. If, on the other hand, neither a fault signal nor a sensor signal is present at the input of the control device, it is highly probable that it is necessary to search for a fault in the cable connection between the control device and the sensor, i.e. in particular between the control device SG and the signal processing unit $\mu P_1$, $\mu P_2$.

Figure 2:
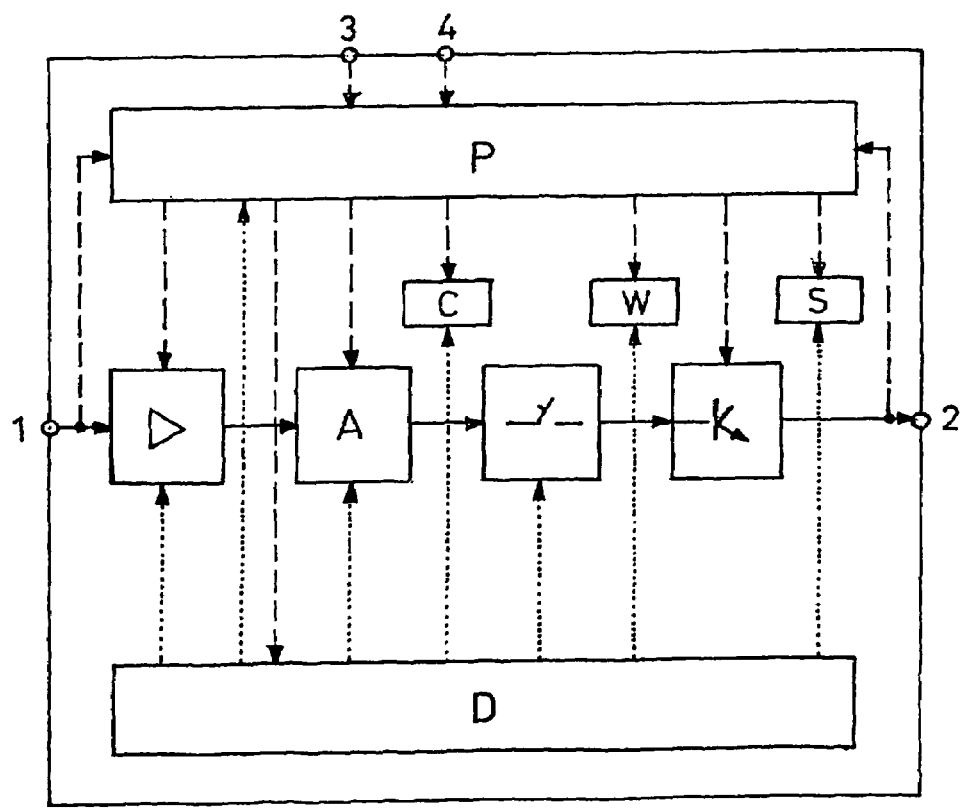
FIG. 2 is a block circuit diagram showing part of a sensor according to the invention.

That part of a sensor according to the invention which is illustrated in FIG. 2 is substantially realized by a signal processing unit, as is illustrated, for example, in FIG. 1. The signal processing unit shown in FIG. 2 has a connection 1, through which the signal processing unit can be connected to a converter element. The signal processing unit, with the converter element connected to the connection 1, then forms a sensor according to the invention. The signal processing unit can be connected to an electrical device, for example to a control device SG, as is illustrated in FIG. 1, through an output 2. Two connections 3, 4 substantially serve the purpose of supplying electrical energy (operating voltage) to the signal processing unit.

The signal processing unit illustrated in FIG. 2 serves various functions, which are illustrated as blocks in FIG. 2. The various blocks are connected to one another through arrows. These arrows, which are either illustrated as continuous lines, dashed lines or dotted lines, represent various flows of information within the signal processing unit. The functions of the signal processing unit will be described in more detail below.

The analog signal, which is made available at the input 1 of the signal processing unit by the converter element, is made available at the output 2 once it has been treated or processed within the signal processing unit in various ways. The analog signal which is initially at the input 1 is processed in this case to provide the sensor signal of the sensor, which can be tapped off at the output 2. The transport of the signal is illustrated by the arrows with the continuous lines. Accordingly, the analog signal, which is made available at the input 1 by the associated converter element, is first amplified (triangular amplifier symbol) and then fed to a signal conditioning step A. The conditioned signal is fed, with the interconnection of a switch (see the switch symbol), to an end stage (see the transistor symbol). The end stage amplifies the signal in such a way that it is made available as a sensor signal of the desired type at the interface, i.e. at the output 2, of the sensor.

The signal processing unit illustrated in FIG. 2 is constructed in such a way that various functions of the signal processing unit can be set by externally input programming. For this purpose, the signal processing unit has a function block designated as a programming device P. The programming device can be driven externally through the connections 1, 2, 3, 4, which is illustrated by the arrows with the dashed lines. Further function blocks of the signal processing unit can then be set starting from the programming device. These function blocks are firstly the above-mentioned amplifier, the signal conditioning step A, the switch and the end stage and secondly further function blocks such as an internal clock C, a monitoring device designated as a watchdog W, a power supply device S and a device D for diagnosis. The possibility of programming the listed function blocks of the signal processing unit is likewise illustrated by arrows with dashed lines.

The function block "device D for diagnosis" serves the function of monitoring the various other function blocks for their correct functioning. This is illustrated by arrows with dotted lines in FIG. 2. As soon as the device D for diagnosis discovers faulty functioning in one of the monitored function blocks, the diagnosis device D causes a particular fault signal to be made available at the output 2 instead of the possibly faulty sensor signal. Through the use of the fault signal, a user or a monitoring device can establish that the functioning of the sensor has been disrupted. For this purpose, the diagnosis device acts on the switch. The signal processing unit preferably also indicates the nature and the location of the fault, with the result that it is possible to find the cause of the fault in a targeted manner and it is likewise possible to eliminate the fault more quickly.

A sensor according to the invention can moreover also be constructed in such a way that the converter element is an integrated component of the signal processing unit. This has the advantage that the converter element can also then be monitored by the diagnosis device without any complexity which is relatively great.

Such an integrated converter element is provided in the case of the sensors shown in FIG. 2. In the case of the sensors shown in FIG. 2, the converter element is provided in the form of a function block within the signal processing unit and is designated by reference symbol I in the illustration of FIG. 3. The sensors shown in FIG. 3, which are moreover of identical construction, therefore do not have a connection for the purpose of connecting a converter element.

Figure 3:
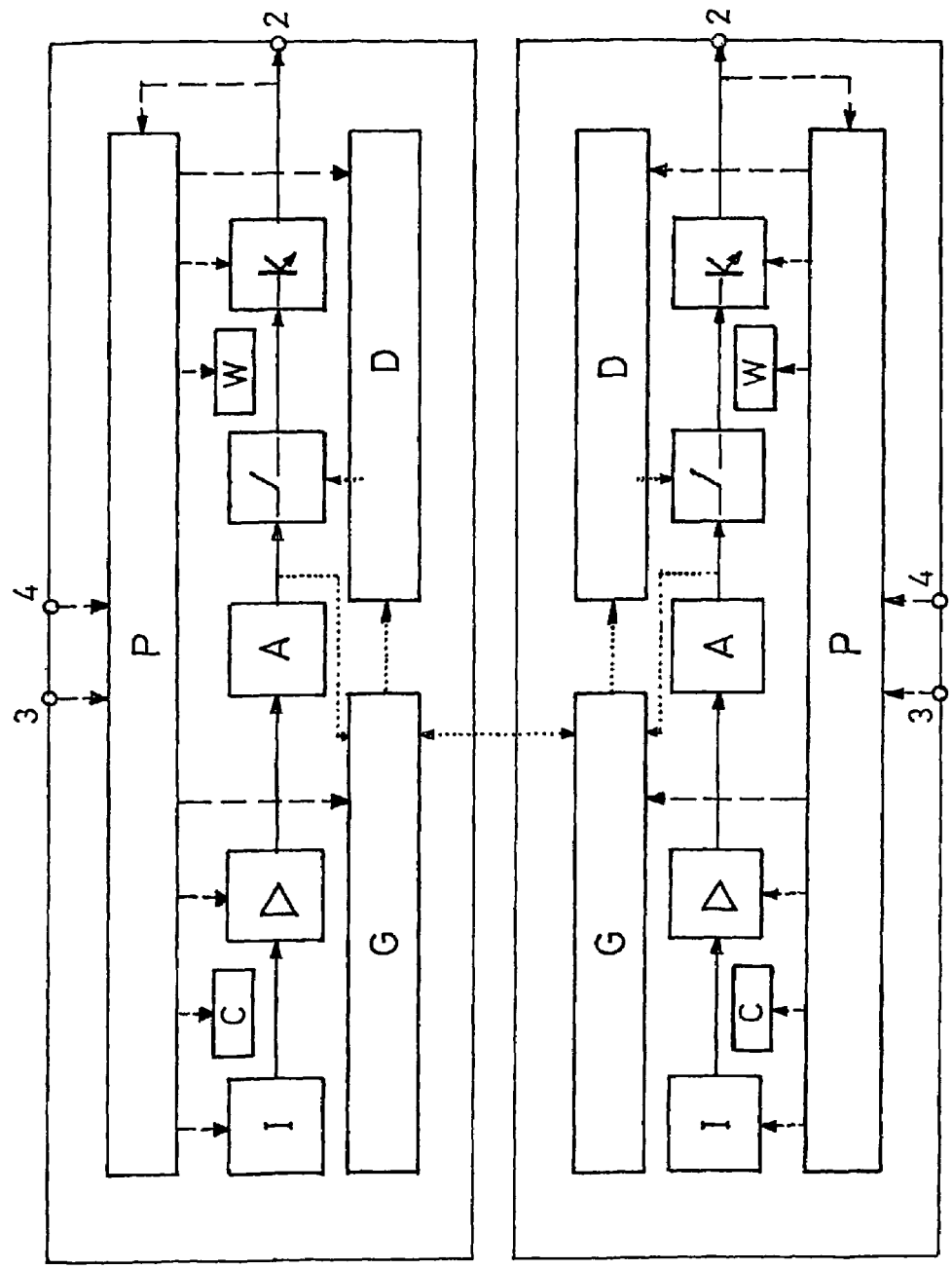
FIG. 3 is a block circuit diagram including two sensors according to the invention.

The sensors shown in FIG. 3 can likewise be programmed as the sensor or the signal processing unit shown in FIG. 2. In this case, the programming takes place through the output 2 and connections 3, 4 for the operating voltage. The programming information is passed to a programming device P, which then sets the various function blocks. The path for the programming information from the connections 2, 3, 4 to the programming device and from the programming device to the function blocks to be programmed is illustrated by arrows with dashed lines, as was also the case in FIG. 2.

The signal which is actually of interest, namely the signal made available as the sensor signal 2 at the output and measured by the integrated converter element I, is first amplified in an amplifier (triangular amplifier symbol), conditioned in a signal conditioning step A, then fed through a switch to an end stage (transistor symbol), from which it is made available as a sensor signal at the output 2. Through the switch, a diagnosis device can exert an influence on the signal made available at the output 2 and can take care to ensure that a fault signal is made available at the output 2 instead of the sensor signal. The diagnosis device causes a fault signal to be made available at the output 2 as soon as a fault occurs within the sensor which results in synchronism of the two sensors in FIG. 3 no longer being ensured.

The two sensors illustrated in FIG. 3, as has already been mentioned, are of identical construction. They are used for the redundant measurement of the same physical variable. During fault-free operation of the two sensors, identical sensor signals or signals with an information content therefore need to be present at the outputs 2 of the two sensors. That is to say, as soon as different sensor signals are available at the output 2, a fault must be present in one of the two sensors. In order to avoid such a case in which two different sensor signals are made available at the outputs 2, in the case of the sensors according to the invention shown in FIG. 3, a device is provided for monitoring the synchronism (synchronism monitoring device, G). These synchronism monitoring devices monitor the signal made available by the function block "signal conditioning step" A. The two synchronism monitoring devices of the two sensors are connected to one another in such a way that the synchronism monitoring device can receive information on the signal made available by the signal conditioning step A of the respective other sensor and can monitor the synchronism of the two signals. If the two signals made available by the function blocks "signal conditioning step" A differ from one another by more than a tolerable extent, the synchronism monitoring device signals to the diagnosis device of the sensors that there is no longer synchronism between the two sensors. The diagnosis device of the faulty sensor influences the switch to the extent that a fault signal can be tapped off at the output 2 of the sensor instead of the sensor signal.

The sensors shown in FIG. 3 can moreover also be constructed in such a way that the diagnosis device, in the event of a fault signaled by the synchronism monitoring device, checks the individual function blocks for their fault-free functioning and then only the sensor having a diagnosis device which has diagnosed a faulty function block makes a fault signal available at the output 2.

We claim:

1. A sensor for measuring a variable, the sensor comprising:
   at least one converter element converting the variable into an electrical signal;
   at least one electronic signal processing unit for at least one of conditioning or processing the electrical signal to provide a sensor signal, said at least one electronic signal processing unit having at least one diagnosis device; and
   an interface for passing on the sensor signal through a connection to an electrical device;
   said diagnosis device causing a fault signal instead of the sensor signal to be present at said interface when a fault occurs, for clearly distinguishing a fault at said interface from a processing fault.

2. The sensor according to claim 1, wherein the variable is a physical variable.

3. The sensor according to claim 1, wherein the electrical device is a control device.

4. The sensor according to claim 1, wherein the connection is a cable connection.

5. The sensor according to claim 1, wherein the fault signal is a fixed potential which is otherwise not used functionally.

6. The sensor according to claim 5, wherein the fault signal is a predetermined fixed potential.

7. The sensor according to claim 1, wherein the fault signal is a sequence of different electrical potentials.

8. The sensor according to claim 1, wherein the fault signal is a predetermined sequence of different electrical potentials.

9. The sensor according to claim 1, wherein the fault signal is a repetitive pattern of electrical potentials.

10. The sensor according to claim 1, wherein the fault signal contains information on the nature of the fault.

11. The sensor according to claim 1, wherein the fault signal is a continuous change in minimum and maximum potentials.

12. A circuit, comprising:
    at least two sensors, at least one of said sensors being a sensor according to claim 1.

13. The circuit according to claim 12, wherein said sensors measure the same electrical variable.

14. The circuit according to claim 13, wherein at least one of said sensors includes a device for monitoring synchronism of said sensors.

15. The circuit according to claim 14, wherein said sensor having said synchronism monitoring device is a sensor according to claim 1.

16. The circuit according to claim 15, wherein said synchronism monitoring device indicates a deviation of at least one of the electrical signal or the sensor signal of said at least two sensors to said diagnosis device as a fault.

17. A method for operating a sensor, the method comprising the following steps:
provide a sensor for measuring a variable, the sensor including:
at least one converter element converting the variable into an electrical signal;
at least one electronic signal processing unit for at least one of conditioning or processing the electrical signal to provide a sensor signal, said at least one electronic signal processing unit having at least one diagnosis device;
an interface for passing on the sensor signal through a connection to an electrical device; and
said diagnosis device causing a fault signal instead of the sensor signal to be present at said interface when a fault occurs, for clearly distinguishing a fault at said interface from a processing fault;
operating the sensor:
during fault-free operation, by converting the variable to be measured into an electrical signal with the converter element and at least one of conditioning the electrical signal or processing the electrical signal with the electronic circuit to provide the sensor signal to be tapped off at the interface; and
during faulty operation, by detecting at least one of an occurrence or a nature of the fault and producing a fault signal with the diagnosis device, to be tapped off instead of the sensor signal at the interface.

18. A method for operating a circuit, which comprises the following step:
operating at least a first one of at least two sensors according to claim 17.

19. The method according to claim 18, which further comprises monitoring synchronism of the at least two sensors with the first sensor and, in the event of a deviation of at least one of the electrical signal or the sensor signal, indicating the fault signal at the interface.

20. A method for operating a sensor, the method comprising the following steps:
during fault-free operation, converting a variable to be measured into an electrical signal with a converter element and at least one of conditioning the electrical signal or processing the electrical signal with an electronic circuit to provide a sensor signal to be tapped off at an interface; and
during faulty operation, detecting at least one of an occurrence or a nature of a fault and producing a fault signal with a diagnosis device, to be tapped off instead of the sensor signal at the interface.

* * * * *